March 4, 1952 E. DUHAIN 2,587,825
PITMAN BEARING
Filed Nov. 8, 1947
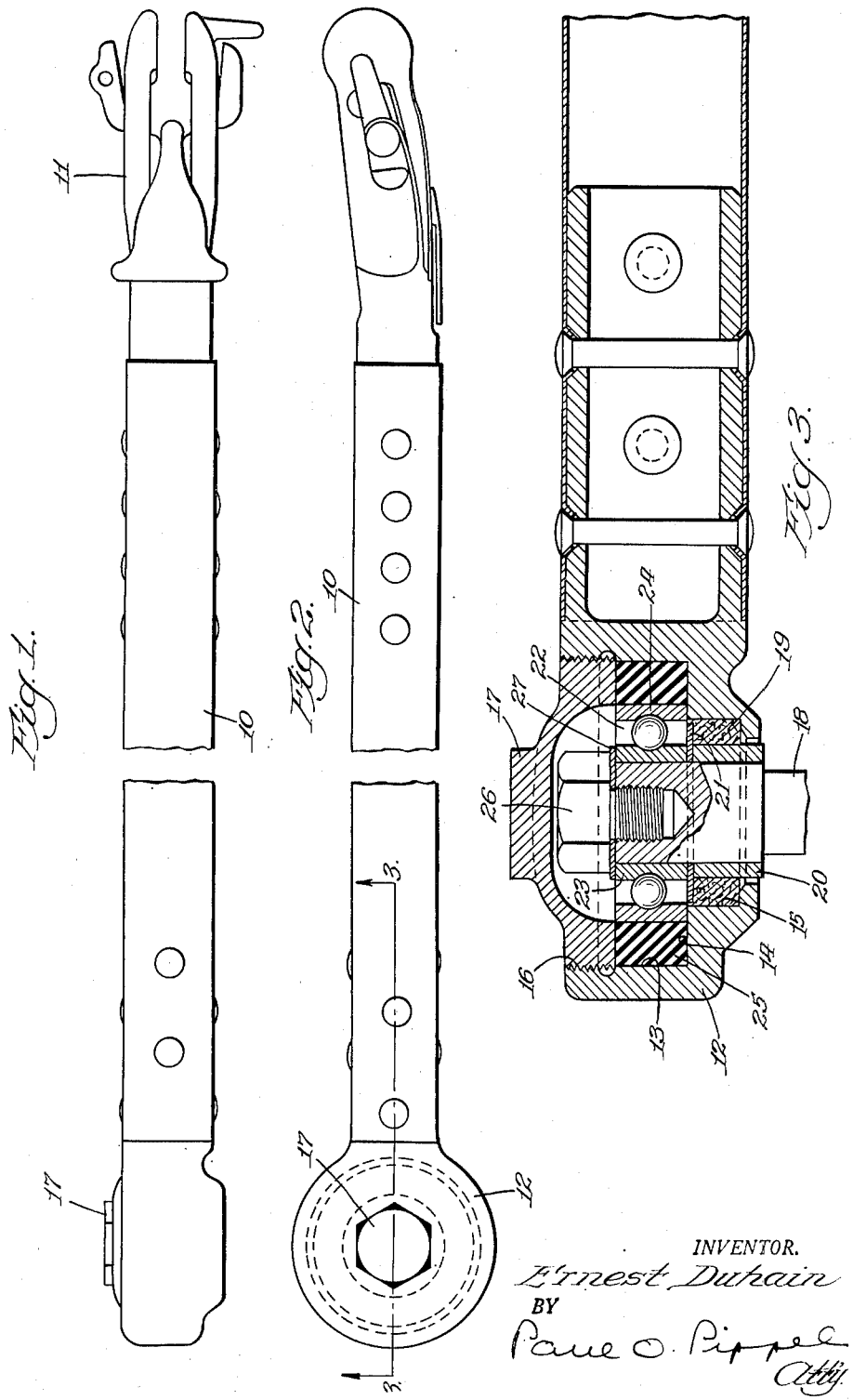
INVENTOR.
Ernest Duhain
BY
Paul O. Pippel
Atty.

Patented Mar. 4, 1952

2,587,825

UNITED STATES PATENT OFFICE 2,587,825

PITMAN BEARING

Ernest Duhain, Croix, France, assignor to International Harvester Company, a corporation of New Jersey Application November 8, 1947, Serial No. 784,863
In France August 13, 1946

2 Claims. (Cl. 308—184)

This invention relates to a pitman bearing of the type finding its greatest usefulness in the art of mowers and harvesters.

A pitman of the class referred to is commonly constructed of wood or metal and serves to connect an eccentric, crank or other rotary member to a reciprocating sickle or knife in a cutter-bar. The distance between the eccentric and the knife-head is such that the pitman is usually elongated and in many cases has sufficient flexibility to accommodate relative movement between the cutter-bar and the frame on which the cutter-bar is supported. In other instances the pitman may be constructed of metal or relatively stiff wood that does not possess such resiliency. Consequently, changes in the angular relationship between the axis of the eccentric or crank and the cutter-bar impart considerable stresses to the pitman, often of such magnitude as to unduly distort or fracture the pitman.

It is an important object of this invention to provide an improved connection between the pitman and the rotary drive member having such characteristics as to impart controlled flexibility between the drive member and the pitman, whereby the pitman may have limited flexing with respect to the drive member.

It is an important object of the invention to provide an improved connection in the form of a ring of compressible flexible material which encircles a bearing carried by the rotary drive member and to combine therewith means carried by the pitman and adjustable with respect thereto for increasing or relaxing the compression on the ring.

Another object of the invention is to provide an improved connection of the class referred to that is simple and inexpensive to construct and that will be efficient and trouble-free in operation.

The foregoing and other important objects and features of the invention will become apparent to those skilled in the art as the disclosure is more fully made in the following detailed description of the preferred embodiment as shown in the accompanying sheet of drawings in which:

Figure 1 is a plan view of a pitman embodying the invention;

Figure 2 is a side view of the same; and

Figure 3 is an enlarged sectional view taken substantially on the line 3—3 of Figure 2.

The pitman comprises an elongated body 10 having at one end thereof connecting means 11 by which the pitman may be connected to the knife-head of a knife or sickle. The other end of the pitman 10 is provided with an enlarged generally circular head portion 12, the interior of which is formed as a circular cup-shaped recess having a circular side wall portion 13 and a flat circular bottom wall 14. The bottom wall is provided with a small opening 15 on the axis of the recess and opening to one side of the pitman portion 12. The recess opens to the opposite side of the portion 12. In effect the circular side wall 13 of the cup-shaped recess provides a counterbore with the bore 15, and the bottom wall 14 of the cup provides a radial shoulder at the junction of these two openings. The axially outermost portion of the circular side wall 13 of the recess is internally threaded at 16 and is normally closed by a cap or cover 17.

A shaft 18, which may form part of a rotary driving member such as an eccentric or crank (not shown), extends through the bore 15 and into the cup-shaped recess. The bore 15 carries an annular felt bushing 19 which encircles a sleeve 20 fitting that portion of the shaft 18 within the bore 15. A washer 21 encircles the shaft 18 and abuts the upper radial faces of the bushing 19 and sleeve 20. Anti-friction bearing means in the form of a ball bearing 22 having inner and outer races 23 and 24 is carried by the shaft 18 on that portion thereof within the cup-shaped recess, the inner race ring 23 fitting the shaft 18 and the outer race ring having a diameter substantially less than the inside diameter of the circular wall 13 of the recess. There is thus provided an annular space between the outer surface of the race ring 24 and the inner surface of the side wall 13.

According to the present invention, this annular space is filled by a ring 25, which is preferably composed of rubber or similar resilient material. The upper radial face of the ring 25 is engaged by the cap or cover 17. Since the cap 17 has threaded engagement with the recess, it may be tightened or loosened to increase or relax compression on the ring 25. Axial compression of the ring 25 between the cap 17 and the shoulder or bottom wall 14 of the recess will increase the rigidity of the ring because of the tendency of the ring to expand radially in response to axial compression.

The end of the shaft 18 within the recess is provided with a threaded axial bore which receives a cap-screw 26. The cap-screw is encircled by a washer 27 which overlies the inner race ring 23 of the bearing 22. This structure provides means for confining the bearing 22 against axial displacement on the shaft 18.

Because of the flexibility of the resilient ring 25, the pitman 10 may have limited flexing with respect to the shaft 18. The flexibility may be varied by adjusting the cap or cover 17. This cap, in addition to providing means for retaining and adjusting the ring 25, also provides means for closing the cup-shaped recess, thus keeping dirt and other foreign matter away from the bearing 22 and at the same time serving as a means for retaining lubricant.

Other desirable features of the invention will undoubtedly occur to those skilled in the art as will various modifications and alterations in the preferred structure disclosed. It is not desired that the scope of the invention be limited to the precise details illustrated and described.

What is claimed is:

1. In combination: a shaft, a pitman extending normal to the axis of the shaft and including a head portion having an enlarged opening therethrough surrounding the shaft and within which the shaft is journaled in the pitman, said opening including a bore concentric with the shaft and opening at one side of the pitman and an enlarged counterbore opening at the opposite side of the pitman, the end of the counterbore adjacent said opposite side of the pitman being internally threaded; bushing means fitting the shaft and carried in the bore; a ring of resilient material carried in the counterbore and encircling the shaft in such manner that a substantial annular space is provided between the outer surface of the shaft and the interior surface of the ring; an annular antifriction bearing fitting the shaft and ring and filling said annular space; and an externally threaded member carried by the aforesaid internally threaded end of the counterbore and having means engaging and axially adjustable toward and away from the ring.

2. The invention set forth in claim 1, in which: the externally threaded member is in the form of a cap providing a closure for the proximate end of the counterbore.

ERNEST DUHAIN.

REFERENCES CITED

The following references are of record in the file of this patent:

UNITED STATES PATENTS

| Number | Name | Date |
|---|---|---|
| 2,271,741 | Mansfield | Feb. 3, 1942 |
| 2,371,206 | Zink et al. | Mar. 13, 1945 |

FOREIGN PATENTS

| Number | Country | Date |
|---|---|---|
| 712,677 | France | Oct. 7, 1931 |